United States Patent [19]
Beer et al.

[11] Patent Number: 5,778,401
[45] Date of Patent: Jul. 7, 1998

[54] INSERTION BAR

[75] Inventors: John Carl Beer, Oceanside, Calif.; Troy Lee Cline, Cedar Park; Ricky Lee Poston, Austin, both of Tex.; Jon Harald Werner, Oceanside, Calif.

[73] Assignee: International Business Machines Corporation, Armonk, N.Y.

[21] Appl. No.: 551,014

[22] Filed: Oct. 31, 1995

[51] Int. Cl.⁶ .................................................. G06T 1/00
[52] U.S. Cl. .................... 707/514; 707/500; 707/510; 707/515; 707/530
[58] Field of Search .......................... 395/776, 761–763, 395/771, 777, 792; 707/514, 500–502, 510, 515, 530

[56] References Cited

U.S. PATENT DOCUMENTS

| | | | |
|---|---|---|---|
| 4,354,185 | 10/1982 | Worborschil | 340/709 |
| 4,688,181 | 8/1987 | Cottrell et al. | 364/521 |
| 4,751,674 | 6/1988 | Aoyagi et al. | 395/776 |
| 4,862,410 | 8/1989 | Fukunaga | 395/776 |
| 4,996,665 | 2/1991 | Nomura | 395/776 |
| 5,263,134 | 11/1993 | Paal et al. | 395/158 |
| 5,276,793 | 1/1994 | Borgendale et al. | 395/792 |
| 5,299,307 | 3/1994 | Young | 395/161 |
| 5,588,099 | 12/1996 | Mogilevsky et al. | 395/771 |

*Primary Examiner*—Joseph H. Feild
*Assistant Examiner*—Motilewa A. Good-Johnson
*Attorney, Agent, or Firm*—Richard A. Henkler; Andrew J. Dillon

[57] ABSTRACT

A computer implemented method, computer system, and article of manufacture embodying computer readable program means direct a computer system to create in a window an insertion bar for inserting hierarchical level identifiers into any hierarchically arranged data. The method includes the first step of inserting a blank line at the location of an insert event, in response to detecting the insert event at the location in the window. The second event includes the step of counting a number of hierarchical levels above the blank line and placing a marker on the blank line, each marker corresponding to a horizontal position of each hierarchical level, thereby creating the insertion bar. The third step includes the step of in response to detecting a move event over one of the markers in the insertion bar, creating an additional hierarchical level identifier of the same hierarchical level and in succession to the hierarchical level corresponding to the selected marker.

6 Claims, 4 Drawing Sheets

INSERTION BAR

BACKGROUND OF THE INVENTION

1. Field of the Invention

The present invention relates to enhancements in user interfaces and, more particularly, but without limitation, to an insertion device for inserting hierarchical identifiers into any hierarchically arranged data.

2. Background Information and Description of the Related Art

FIG. 1 illustrates a prior art window 101 for displaying document 118. Document 118 contains information that is arranged in successive hierarchical levels. For example, first level identifiers (i.e., roman numerals) 104 and 105 are indented a first amount of space (i.e., one tab) and sequentially number major topics, including "scuba diving" and "snow skiing". Second level identifiers, (i.e., letters) 108 and 109 are indented two tabs and sequentially organize subtopics of the major topic "scuba diving", including "gear" and "places to dive", respectively. Third level identifiers (i.e., numbers) 112 are indented three tabs and sequentially number elements of the subtopic "gear", including "regulator", "BCD" and "mask/snorkel".

A conventional user interface allows a user to manipulate/edit the information in document 118. For example, a user may desire to sequentially add more elements in a particular hierarchical level. The user may place, by way of example, mouse pointer 102 below third level identifier 114 and second level identifier 109, click the first button on a mouse, and in response, the user interface causes document 118 to display third level identifier 106 directly below third level identifier 114. Notice that third level identifier 106 (i.e., "4") is in numerical succession with third level identifier 114 (i.e., "3"). Accordingly, the user interface examines the preceding level identifier directly above the point where the user desires to add a new element. In this example, third level identifier 114 is the number "3", so the user interface places a number "4" directly below the number "3" and positions flashing cursor 110 next to third level identifier 106 so that the user may type in any desired data or information.

However, this editing technique presents certain disadvantages and limitations. For example, the user may not desire to add third level identifier 106 as a succession (i.e., an additional element) to third level identifiers 112, but rather may desire to add a new count that is of the same hierarchical level as second level identifiers 108 and 109. Therefore, the user may desire third level identifier 106 to be the letter "B" rather than the number "4", and may desire second level identifier 109 to change to a letter "C". To do this using a conventional user interface, the user must position mouse pointer 102 directly under second level identifier 108, press the first mouse button to create a new letter "B", move the newly created letter "B" to the desired location, and finally manually change second level identifier 109 to a "C". This process is time consuming and tedious.

Accordingly, there is a great demand for a user interface that allows the user to directly choose which hierarchical level a new element will belong to when attempting to add new elements to a document containing hierarchically arranged data.

SUMMARY

Accordingly, a computer implemented method, computer system, and article of manufacture embodying computer readable program means direct a computer system to create in a window an insertion bar for inserting hierarchical level identifiers into any hierarchically arranged data.

The method includes the first step of inserting a blank line at the location of an insert event (e.g., caused by user clicking a mouse pointer between two rows in a document), in response to detecting the insert event at the location in the window. The second event includes the step of counting a number of hierarchical levels above the blank line (e.g., may add one to that number) and placing a marker (e.g. hash mark) on the blank line, each marker corresponding to a horizontal position of each hierarchical level (e.g., one tab over, two tabs over, etc.), thereby creating the insertion bar. The third step includes the step of: in response to detecting a move event over one of the markers in the insertion bar (e.g., user drags an "I" from one hash mark to another, thereby selecting that marker), creating an additional hierarchical level identifier of the same hierarchical level and in succession to the hierarchical level corresponding to the selected marker. The method includes a fourth step of incrementing by one every hierarchical level identifier in the same hierarchical level and below the newly created hierarchical level identifier.

Therefore, it is an object of the invention to provide an enhanced user interface that creates an insertion bar for easily inserting new hierarchical level identifiers in hierarchically arranged data.

It is another object to provide an enhanced user interface that examines the number and position of each hierarchical level above the insertion bar and places a marker on the insertion bar corresponding to each of those positions (plus one position to create a new hierarchical level), thereby allowing the user to easily select one of those markers.

These and other objects, features, and advantages will become even more apparent in light of the following detailed description and drawings.

DETAILED DESCRIPTION OF THE PREFERRED EMBODIMENT

Figure 1:
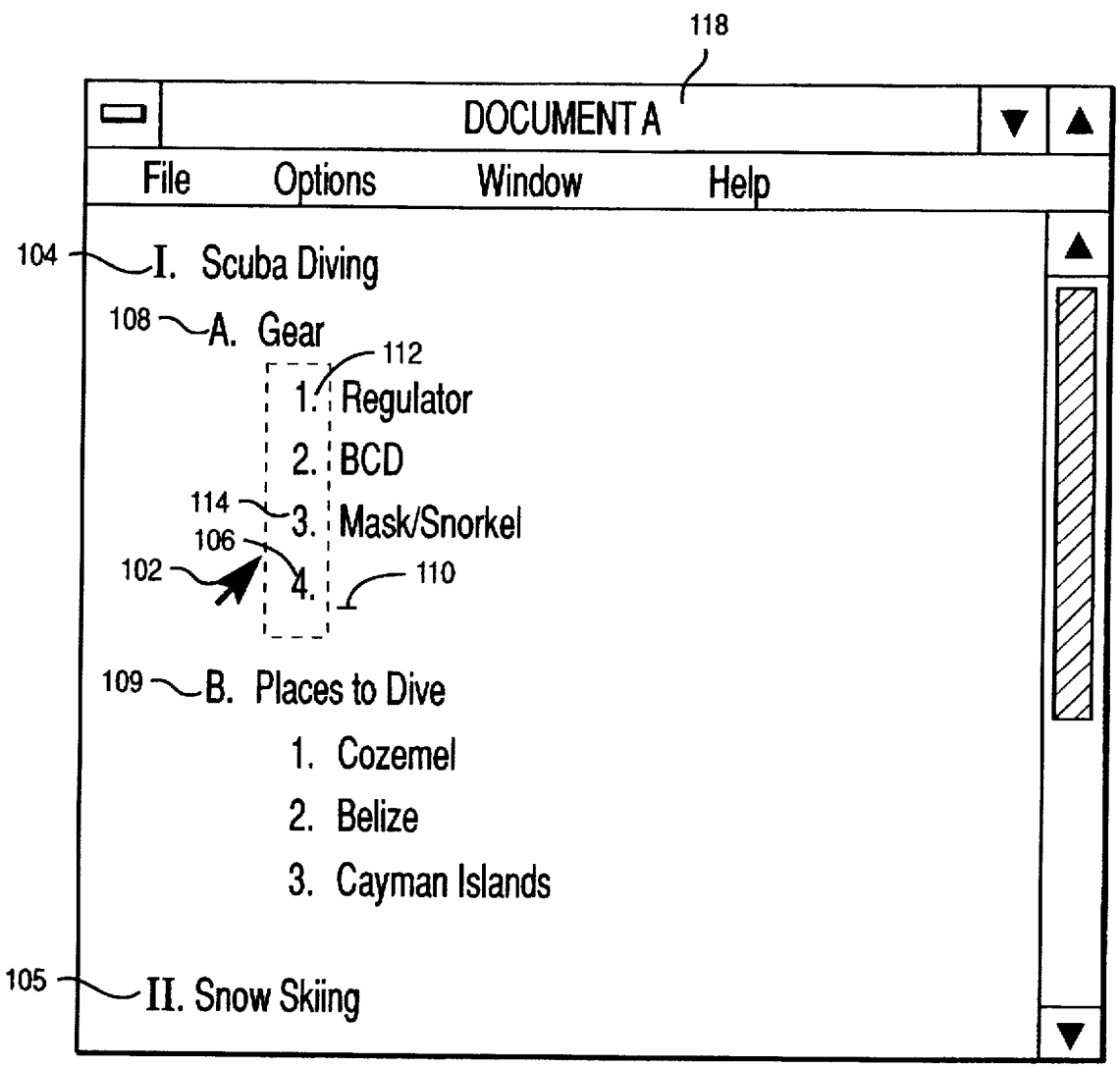
FIG. 1 illustrates a window that displays a document and illustrates a conventional user interface for adding hierarchical level identifiers in the document.
Figure 2:
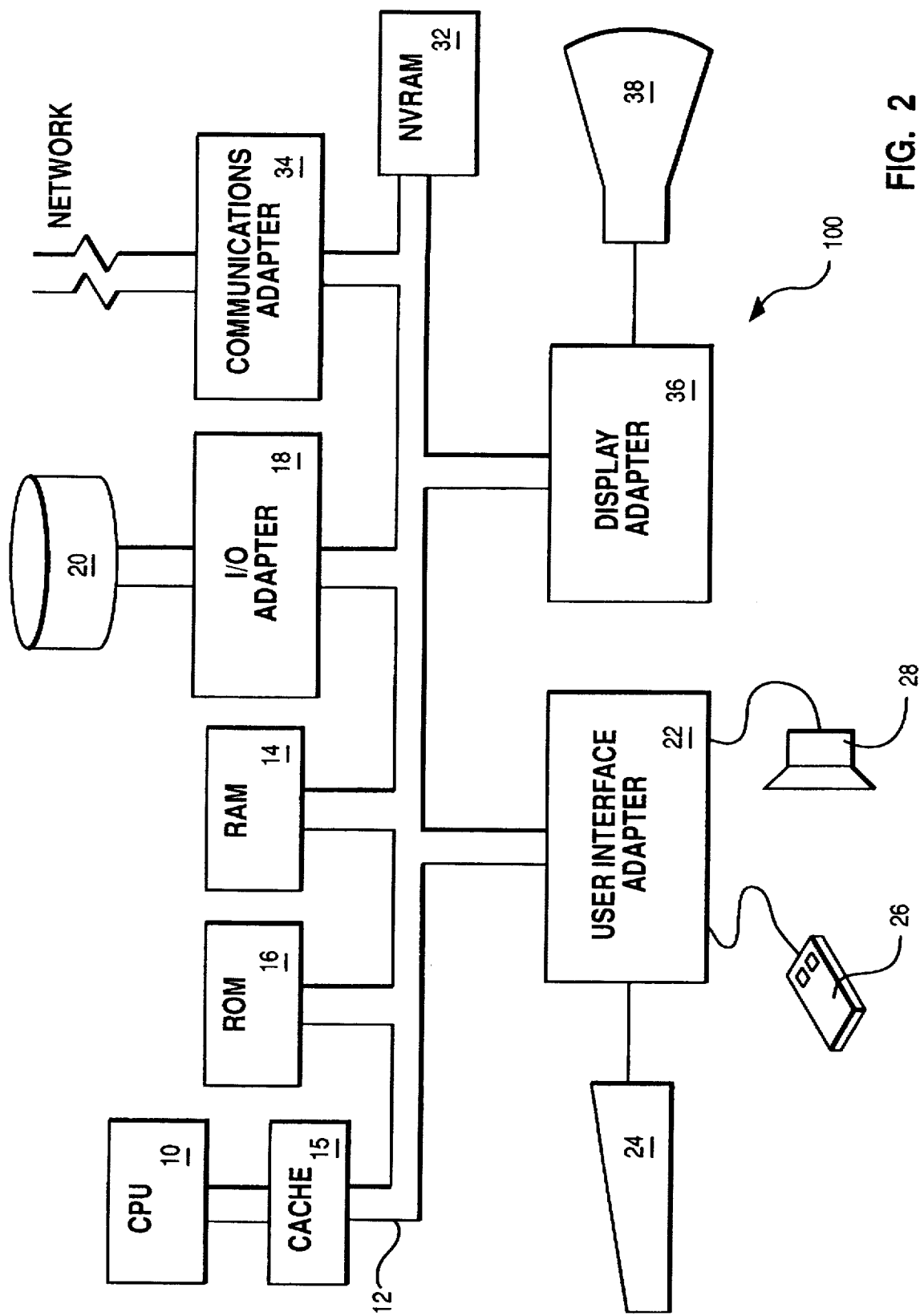
FIG. 2 illustrates a representative hardware configuration for implementing the present invention.

The present invention is practiced in a laptop computer or, alternatively, in the computer system illustrated in FIG. 2. Computer system 100 includes central processing unit (CPU) 10, such as an IBM's™ PowerPC™ 601 or Intel's™ 486 microprocessor for processing cache 15, random access memory (RAM) 14, read only memory 16, and non-volatile RAM (NVRAM) 32. One or more disks 20, controlled by I/O adapter 18, provide long term storage. A variety of other storage media may be employed, including tapes, CD-ROM, and WORM drives. Removable storage media may also be provided to store data or computer process instructions.

Instructions and data from the desktop of any suitable operating system, such as Sun Solaris™, Microsoft's Windows NT™, IBM's OS/2™, or Apple's System 7™, control CPU 10 from RAM 14. Accordingly, the desktop executes from RAM 14. However, in the preferred embodiment, an IBM RISC System/6000™ runs the AIX™ operating system. As previously described, however, one skilled in the art readily recognizes that other hardware platforms and operating systems may be utilized to implement the present invention.

Users communicate with computer system 100 through I/O devices (i.e., user controls) controlled by user interface adapter 22. Display 38 displays information to the user, while keyboard 24, pointing device 26, and speaker 28 allow the user to direct the computer system. Communications adapter 34 controls communications between this computer system and other processing units connected to a network by network interface 40. Display adapter 36 controls communications between this computer system and display 38.

Figure 3:
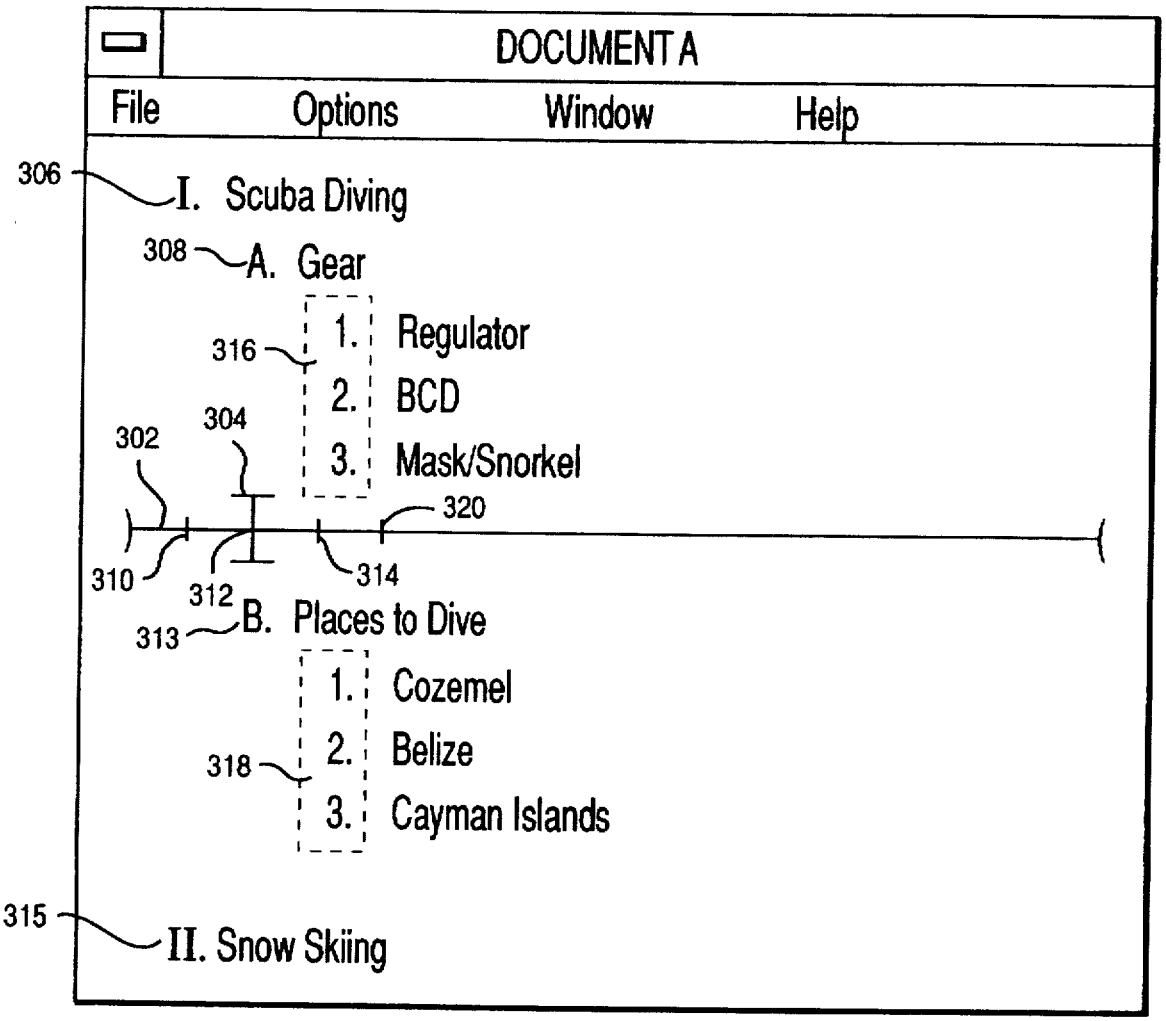
FIG. 3 illustrates a window that displays a document and illustrates a user interface for adding hierarchical level identifiers according to the preferred embodiment.

FIG. 3 illustrates a window for displaying document 300 in accordance with the preferred embodiment. Document 300 could have been created using, for example, an idea processor, browser, outline processor, or word processor. An enhanced user interface provides an interface between document 300 and the operating system, thereby allowing the user to easily manipulate/edit document 300. Document 300 includes first level hierarchical identifiers 306 and 315 (i.e., roman numerals), second level hierarchical identifiers 308 and 313 (i.e., letters), and third level hierarchical identifiers 316 and 318 (i.e., numbers). The third level identifiers are subsets of the second level identifier, and the second level identifiers are subsets of the first level identifiers.

In this example, the user desires to insert a second level hierarchical identifier (i.e., the letter "B") between third level identifiers 316 and second level identifier 313. To do so, the user positions the mouse pointer (not shown) between third level identifiers 316 and second level identifier 313 and presses the first mouse button. In response, the user interface displays insertion bar 302 (herein bar 302). Bar 302 includes hash mark 310 (e.g., a marker), which represents first hierarchical level identifiers and is indented one tab corresponding to the indention of first level identifiers 306 and 315, hash mark 312, which represents second level hierarchical identifiers and is indented two tabs corresponding to the indention of second level identifiers 308 and 313, and finally hash mark 320, which represents third level hierarchical identifiers and is indented three tabs corresponding to the indention of third level identifiers 316 and 318. The browser initially places an "I" over the hash mark representing the level of the preceding row's level. In this case, the browser places an "I" over hash mark 314, which is of the same level as third level identifiers 316. To change the position of the "I", the user positions the mouse pointer over one of the desired hash marks 310, 312, or 320, depending on which hierarchical level identifier the user desires to create.

In this example, the user desires to insert a second hierarchical level identifier. Therefore, the user positions and clicks the mouse pointer over hash mark 312. Alternatively, the user may drag and drop the "I" from hash mark 314 to hash mark 312 (not shown). In response, the user interface places the "I" over the selected hash mark 312. At this point, the user may select another hash mark by simply single clicking over the desired hash mark, or double click the mouse pointer (or equivalent keyboard event) to cause the user interface to make the desired selection. If hash mark 312 is selected, the user interface places a "B" in that position and appropriately re-letters the identifiers below it in the same hierarchical level.

If the user positions the mouse pointer over hash mark 310, the user interface would place a roman numeral "II" in that position and would change third level identifier 315 (i.e., roman numeral "II") to a roman numeral "III". Using the preferred embodiment, the user can easily select the position of a newly added identifier and the hierarchical level that the new identifier belongs to, all in one simple step using bar 302.

Figure 4:
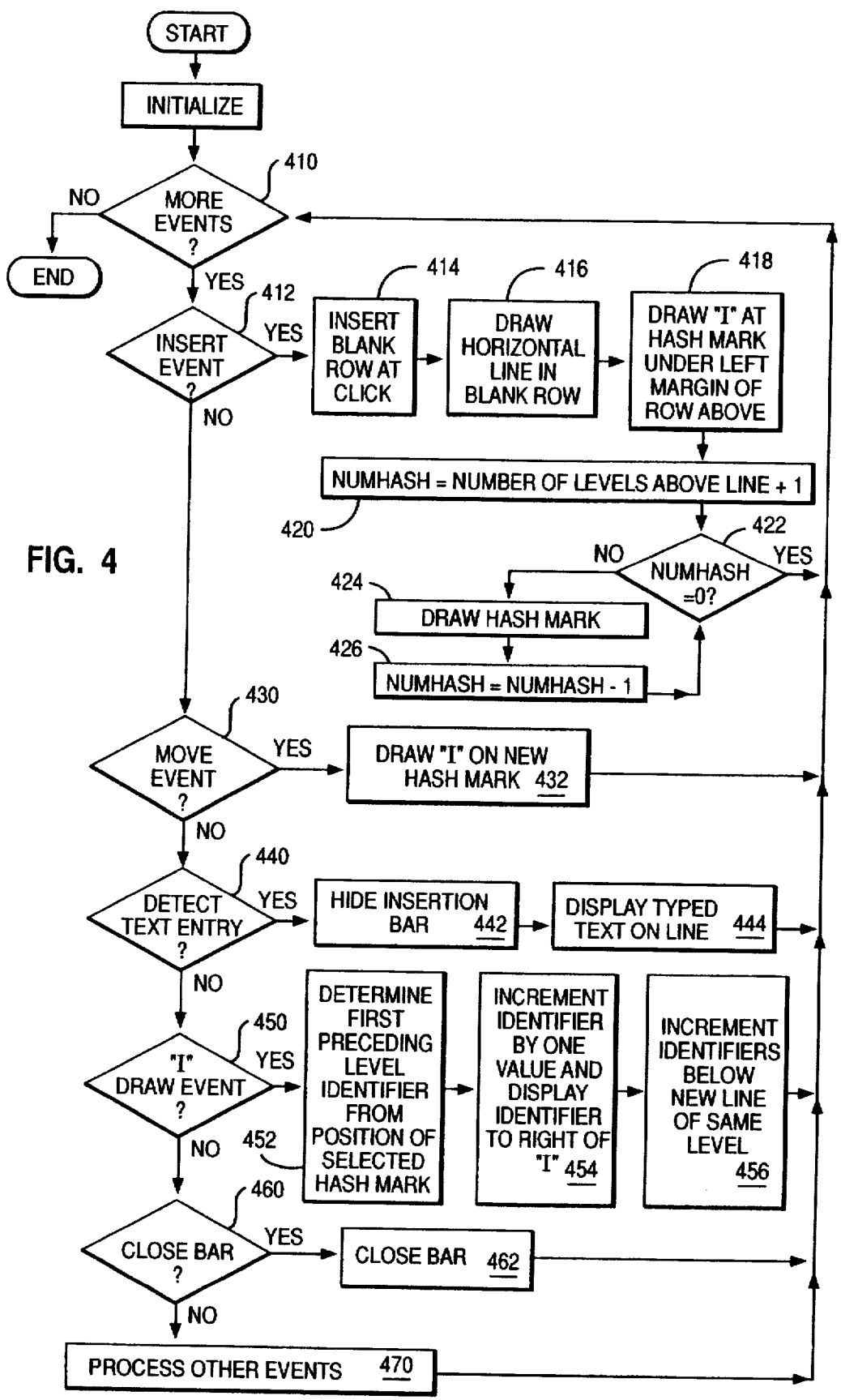
FIG. 4 illustrates a flowchart of detailed logic for implementing the preferred embodiment.

FIG. 4 illustrates a flowchart of detailed logic for implementing the preferred embodiment. At 410, the user interface determines if there are events to be processed. If so, at 412 the UI determines if an insert event has occurred. This event would occur if a user had clicked between rows of text in a document. If so , at 414, the UI inserts a blank row at the position of the detected click. At 416, the UI draws a horizontal line (i.e., bar 302) in the blank row. At 418, the UI draws an "I" at a hash mark under the left margin of the row above. Accordingly, if the row above the new blank line was indented three tabs, an "I" will be positioned on a hash mark on the new horizontal line indented three tabs. At 420, the UI sets a variable NUMHASH=the number of levels present in the document above the new horizontal line+1. Therefore, referring to FIG. 3, because there are three different levels of identifiers (e.g., 306, 308, and 316), NUMHASH would be set to 4. At 422, the UI determines if NUMHASH is equal to 0. If not, at 424, the UI draws a hash mark at the position equal to NUMHASH. For example, in the previous example, NUMHASH was equal to 4. Therefore, the UI would draw a hash mark at the fourth tabbed position. At 426, the UI subtracts 1 from NUMHASH and control returns to 422, where the UI determines if NUMHASH is equal to 0. In this example, NUMHASH would have been decremented by 1 to a number of 3. Therefore at 424, the UI would draw another hash mark at the third tabbed position. This process continues until hash marks are placed on the horizontal line for each tabbed level plus 1. Control returns to 410.

At 430, the UI determines if an move event has occurred. If so, at 432, the UI draws an "I" on the new selected hash mark. For example, the user may drag and drop the "I" on another hash mark. Control returns to 410.

At 440, the UI determines if a text detect entry event has occurred. If so, at 442, the UI hides the insertion bar 302 and, at 444, the UI displays any typed text entered on the line. Control returns to 410.

At 450, the UI determines if a "I" draw event has occurred. This event would be generated at 432. If so, at 452, the UI determines the first preceding level identifier from the position of the selected hash mark. At 454, the UI increments the identifier by one value and displays the identifier to the right of the "I". At 456, the UI increments any identifiers below the new line of the same hierarchical level. Control returns to 410.

At 460, the UI determines if a closed bar event has occurred. This event would occur if the user clicked on any empty space or clicked between two other rows of text. If so, the UI closes the insertion bar at 462. Control returns to 410. At 470, the UI processes other events. If no more events are detected at 410, the process ends.

While the invention has been shown and described with reference to particular embodiments thereof, it will be understood by those skilled in the art that the foregoing and other changes in form and detail may be made therein without departing from the spirit and scope of the invention.

What is claimed is:

1. A graphical method for directing a computer system to create in a window an insertion bar for inserting hierarchical level identifiers into existing hierarchically arranged data within said window, comprising the steps of:

in response to detecting a graphical insert event at a location within said existing hierarchically arranged data in the window, inserting a blank line at the location of the graphical insert event;

counting a number of hierarchical levels within said existing hierarchically arranged data above the blank line and placing a marker on the blank line corresponding to a position of each hierarchical level, thereby creating the insertion bar;

in response to detecting graphical selection of one of the markers in the insertion bar, creating an additional hierarchical level identifier of the same level and in succession to the hierarchical level corresponding to the selected marker;

automatically altering each subsequent hierarchical level identifier below said additional hierarchical level identifier within said same level of said existing hierarchically arranged data.

2. The graphical method according to claim 1 wherein said step of placing a marker on the blank line corresponding to a position of each hierarchical level comprises the step of placing a hash mark on a horizontal line corresponding to a position of each hierarchical level.

3. The graphical method according to claim 1 wherein said step of automatically altering each subsequent hierarchical level identifier below said additional hierarchical level identifier within said same level of said existing hierarchically arranged data comprises the step of automatically incrementing each subsequent hierarchical level identifier below said additional hierarchical level identifier within said same level of said existing hierarchically arranged data.

4. A graphical system for directing a computer system to create in a window an insertion bar for inserting hierarchical level identifiers into existing hierarchically arranged data within said window, comprising:

means for inserting a blank line at the location of the graphical insert event in response to detecting a graphical insert event at a location within said existing hierarchically arranged data in the window;

means for counting a number of hierarchical levels within said existing hierarchically arranged data above the blank line and placing a marker on the blank line corresponding to a position of each hierarchical level, thereby creating the insertion bar;

means for creating an additional hierarchical level identifier of the same level and in succession to the hierarchical level corresponding to the selected marker in response to detecting a graphical selection of one of the markers in the insertion bar;

means for automatically altering each subsequent hierarchical level identifier below said additional hierarchical level identifier within said same level of said existing hierarchically arranged data.

5. The graphical system according to claim 4, wherein said means for placing a marker on the blank line corresponding to a position of each hierarchical level comprises means for placing a hash mark on a horizontal line corresponding to a position of each hierarchical level.

6. The graphical system according to claim 4, wherein said means for automatically altering each subsequent hierarchial level identifier below said additional hierarchical level identifier within said same level of said existing hierarchically arranged data comprises means for automatically incrementing each subsequent hierarchical level identifier below said additional hierarchical level identifier within said same level of said existing hierarchically arranged data.

* * * * *